(12) United States Patent
Chen et al.

(10) Patent No.: US 6,394,409 B1
(45) Date of Patent: May 28, 2002

(54) REAL TIME OBSERVABLE SAMPLE MOUNTING FIXTURE

(75) Inventors: Chih-Jian Chen, Hsin-Chu; Chin-Kai Liu, Tai Chung, both of (TW)

(73) Assignee: Taiwan Semiconductor Manufacturing Company, Ltd., Hsin Chu (TW)

( * ) Notice: Subject to any disclaimer, the term of this patent is extended or adjusted under 35 U.S.C. 154(b) by 0 days.

(21) Appl. No.: 09/483,216

(22) Filed: Jan. 14, 2000

(51) Int. Cl.[7] .............................................. F16M 11/00
(52) U.S. Cl. ..................... 248/694; 250/306; 250/307
(58) Field of Search .................... 248/694; 250/306, 250/307, 423 F, 442.1; 350/530; 74/470, 479

(56) References Cited

U.S. PATENT DOCUMENTS

| | | | | |
|---|---|---|---|---|
| 4,585,351 A | * | 4/1986 | Gronek et al. ............... | 356/388 |
| 4,620,776 A | * | 11/1986 | Ima .............................. | 350/529 |
| 4,762,996 A | * | 8/1988 | Binning et al. ............. | 250/306 |
| 5,249,077 A | * | 9/1993 | Laronga et al. ............. | 359/385 |
| 5,296,704 A | * | 3/1994 | Mishima et al. ............ | 250/306 |
| 5,715,082 A | * | 2/1998 | Saccomanno et al. ....... | 359/391 |

* cited by examiner

Primary Examiner—Anita King
Assistant Examiner—Gwendolyn Baxter
(74) Attorney, Agent, or Firm—Tung & Associates

(57) ABSTRACT

An observable sample mounting fixture for mounting an IC specimen to a protective substrate is provided. In the sample mounting fixture, a base portion and a top portion are provided which are integrally connected together with a cavity therein-between for receiving a specimen. The base portion is further provided with an observation window such that the state of cure of an adhesive layer between a substantially transparent substrate and the IC specimen can be observed in real time. During an early observation, i.e., when the sandwiched structure is only cured for 2–5 minutes, the sandwiched structure can be easily disassembled when bubbles are observed. By utilizing the present invention novel sample mounting fixture, valuable test specimens can be saved for providing valuable quality control and reliability data. The sample mounting fixture is further constructed with a compression means which includes a shaft, a coil spring, a handle and a compression foot for contacting the IC specimen during a curing process of the sandwiched structure.

19 Claims, 2 Drawing Sheets

REAL TIME OBSERVABLE SAMPLE MOUNTING FIXTURE

FIELD OF THE INVENTION

The present invention generally relates to a sample mounting fixture for preparing samples for microscopic observation and more particularly, relates to an observable sample mounting fixture that can be used to mount a sample to a substrate while allowing the mounting and curing process be inspected through a window provided in the mounting fixture.

BACKGROUND OF THE INVENTION

In the study of electronic materials and processes for fabricating such materials into electronic devices, a thin specimen is frequently required for analysis and for process validation. For instance, thin specimens are frequently used in the analysis of semiconductor structures by a transmission electron microscopy (TEM) method. TEM is one of the more popular methods used in analyzing the microscopic structures of semiconductor devices. The advantages achieved by a TEM method over that of a canning electron microscopy (SEM) method are higher magnification and simpler specimen preparation since no staining is required, even though a more three dimensional image can be obtained by the SEM method.

In preparing thin specimens of semiconductor structures for a TEM investigation. various polishing and milling process are involved so that specimens having thicknesses less than 1 $\mu$m can be obtained. As device dimensions are continuously being reduced to the sub-half-micron level, the use of thin specimens for study by the TEM method becomes more important In general, when a thin specimen is prepared for a TEM study, various mechanical polishing methods are first used to bring the dimension of the specimen down to its approximate dimension. A final sample preparation process is then accomplished in a method called ion milling. The ion milling method is frequently conducted by a forced ion beam (FIB) technique. In the FIB technique, focused ion beams are used to either locally deposit or remove materials.

Before an integrated circuit specimen can be polished or milled, the surface of interest on the specimen must be protected. For instance, when a specimen is prepared for transmission electron microscopic (TEM) observation, a typical procedure used is to mount a protective glass slide on the top surface of the specimen. In order to mount the glass slide to the specimen, a layer of an epoxy adhesive is used. For observing the specimen in a transmission mode, it is preferred that the epoxy adhesive should be substantially clear or transparent.

In mounting a protective glass slide to the surface of an IC specimen, problem in bonding frequently occurs which leads to air bubble inclusions in the adhesive layer. The air bubble inclusions can be caused by a variety of factors, i.e., any residual cleaning solvent such as acetone that was left on the surface of the specimen may lead to air bubbles when the solvent evaporates during the adhesive curing process, inadequate mounting procedure when the glass slide is placed on the IC specimen or a defective adhesive material which produces air bubbles during a subsequent high temperature curing process. When air bubble inclusions occur in the specimen prepared, the specimen is rendered useless for subsequent microscopic examination due to optical distortion caused by the air bubbles. The problem becomes more serious when there is only one or very few specimens available for observation such that the risk of losing even one specimen is not acceptable. Any air bubble inclusions in the specimen therefore lead to the scrap of the specimen. This is because when air bubbles are observed after the adhesive curing process, the protective glass slide can no longer be removed without destroying the specimen surface that is to be examined. A reliable specimen preparation method is therefore a critical step in the quality assurance of IC chip fabrication process.

A conventional mounting method for an IC specimen 10 to a protective glass slide 12 is shown in FIGS. 1A~1C. In this conventional mounting method, an IC specimen 10 and a protective glass slide 12 are first provided, as shown in FIG. 1A. A substantially clear adhesive layer 20 is then coated on the top surface of the IC specimen 10 for mounting the protective glass slide 12 thereto. The sandwiched structure 22 is then placed between two teflon plates 14, 16 and clamped under pressure for curing in an oven. An oven curing temperature of at least 100° C. can be used for a time period of about 15 minutes. This is shown in FIG. 1B. After the curing process is completed, the sandwiched structure 22 is removed first from the oven and then from the teflon plates 14, 16 as shown in FIG. 1C. Air bubble inclusions 18 observed in the adhesive layer 20 after the high temperature curing process render any TEM examination of the specimen impossible. It is further impossible to remove the glass slide 12 and the adhesive layer 20 without substantial damage to the surface of the IC specimen 10.

It is therefore an object of the present invention to provide a sample mounting fixture that can be used to mount an IC specimen to a protective glass slide that does not have the drawbacks or shortcomings of the conventional mounting fixtures.

It is another object of the present invention to provide an observable sample mounting fixture for mounting an IC specimen to a protective glass slide in an adhesive mounting process wherein the process can be observed in real time.

It is a further object of the present invention to provide an observable sample mounting fixture for mounting an IC specimen to a protective glass slide wherein an early detection of bubble formation in the adhesive layer is possible.

It is another further object of the present invention to provide an observable sample mounting fixture for mounting an IC specimen to a protective glass slide by a clear adhesive wherein air bubble formation can be detected in an early stage of the mounting process such that the glass slide can be removed and the mounting process can be repeated.

It is still another object of the present invention to provide an observable sample mounting fixture for mounting an IC specimen to a protective glass slide wherein the fixture is provided with an observation window such that an early detection of air bubble formation in the specimen surface can be visually made.

It is yet another object of the present invention to provide an observable sample mounting fixture for mounting an IC specimen to a protective glass slide wherein the mounting process can be monitored in real time by placing the fixture in an optical microscope.

It is still another further object of the present invention to provide an inspectable sample holder for mounting a sample to a substrate by using a sleeve bearing in the sample holder such that a vertically exerted pressure can be applied to the sample and the substrate.

It is yet another further object of the present invention to provide an inspectable sample holder for mounting a sample to a transparent substrate by providing an observation window in the sample holder such that the condition of the sample/transparent substrate can be monitored throughout the mounting process in an optical microscope.

SUMMARY OF THE INVENTION

In accordance with the present invention, an observable sample mounting fixture for mounting an IC specimen to a protective glass slide which can be continuously monitored during the mounting process is provided.

In a preferred embodiment, an observable sample mounting fixture is provided which includes a base portion and a top portion integrally connected together providing a cavity thereinbetween for receiving a sample, the base portion is provided with a window for observing the sample when positioned on the base portion, the top portion is provided with a recess therein for receiving a compression means, the recess further includes elongated slot openings through side walls of the top portion for receiving a handle of the compression means, the compression means has a shaft, a sleeve bearing for receiving the shaft in an upright position through a center aperture, a coil spring mounted on the shaft for pressing a compression foot formed on a bottom end of the shaft against a top surface of the sample when the sample is positioned on the base portion, and the coil spring has an upper end pressing against a lower surface of the sleeve bearing when the bearing is fixedly mounted in the recess in the top portion of the fixture such that the compression foot exerts a vertically downward force on the sample positioned on the base portion by the action of the coil spring.

In the observable sample mounting fixture, the window in the base portion may be formed of an aperture and a transparent plate covering the aperture. The handle may be integrally formed with the shaft of the compression means for gripping by human fingers when the handle protrudes through the elongated small openings to compress the coil spring and to lift the compression foot from the top surface of the sample. The base portion and the top portion may have a cross-sectional area of a rectangle, or may have a cross-sectional area of at least 2 cm×3 cm. The sample may be a sample for transmission electron microscopy, or maybe an integrated circuit chip mounted to a glass slide by a transparent adhesive. The mounting fixture may be fabricated of a metal, or of aluminum. The compression foot may be formed of teflon.

In another preferred embodiment, an inspectable sample holder for mounting a sample to a substrate is provided which includes a holder body that has a bottom plate equipped with a see-through window, the bottom plate has a flat top surface for receiving the sample and the substrate thereon, a compression shaft equipped with a compression foot on a bottom of the shaft, a sleeve bearing frictionally engaging a recess in the holder body for vertically guiding the compression shaft through a center aperture in the bearing, and a coil spring acting between the sleeve bearing and the compression foot for vertically pressing the sample and the substrate together against the bottom plate of the holder body.

In the inspectable sample holder for mounting a sample to a substrate, the sample may be an integrated circuit chip and the substrate may be a glass slide. The sample and the substrate may be mounted together by a transparent adhesive. The compression shaft may further include a handle portion integrally formed therewith for gripping by human fingers for relieving a compressive force placed on the sample and substrate by the coil spring. The handle portion protrudes through elongated small openings in the holder body for gripping by human fingers. The holder body may be fabricated of a metal and dimensioned such that it fits inside a specimen stage of an optical microscope. The compression foot may be formed without a sharp point. The see-through window allows an observation of air bubble formation in a transparent adhesive layer between the sample and a substantially transparent substrate. A substantially transparent adhesive such as epoxy or polyurethane may be used to mount the sample to the substrate.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figure 1A:
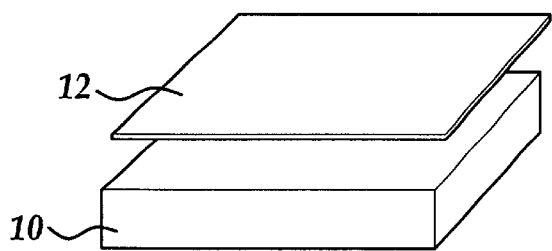
FIG. 1A is a prospective view of an IC specimen and a protective glass slide to be mounted by a conventional mounting method.
Figure 1B:
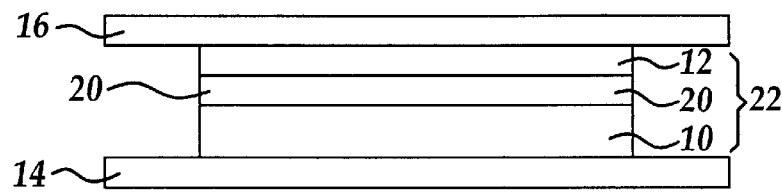
FIG. 1B is a cross-sectional view of the IC specimen and the protective glass slide of FIG. 1A mounted by an adhesive layer 20 and clamped between two compression plates.
Figure 1C:
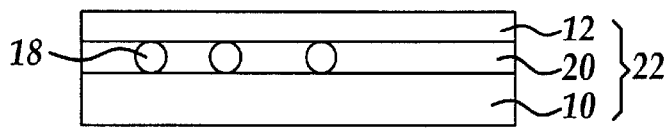
FIG. 1C is a cross-sectional view of the IC specimen and the protective glass slide with an air bubble containing adhesive layer therein-between mounted by the conventional method.

The present invention discloses an inspectable sample holder for mounting a sample to a substrate. The sample holder can be constructed by a holder body that has a bottom plate equipped with a see-through window and a flat top surface for receiving the sample and the substrate. The holder further includes a compression shaft, a sleeve bearing and a coil spring wherein the compression shaft is provided with a compression foot on a bottom portion of the shaft, the sleeve bearing frictionally engaging a recess in holder body such that it vertically guides the compression shaft through a center aperture, and the coil spring acts between the sleeve bearing and the compression foot for vertically pressing the sample and the substrate together against the bottom plate of the holder body during a high temperature curing process.

The present invention further provides an observable sample mounting fixture that can be constructed by a base portion and a top portion which are integrally connected together to provide a cavity therein-between for receiving a sample. The base portion can be provided with a window for observing the sample when positioned on the base portion during a curing process. The top portion of the fixture is provided with a recess for receiving a compression means. The recess may further be equipped with elongated slot openings through side walls of the top portion for receiving a handle provided on the compression means. The compression means can be constructed of a shaft, a sleeve bearing for receiving the shaft in an upright position through a center aperture a coil spring that is mounted on the shaft for pressing the compression foot of the shaft against a top surface of the sample when the sample is positioned on the base portion. The coil spring has an upper end compressed against a lower surface of the sleeve bearing when the bearing is fixedly mounted in the recess in the top portion of the fixture so that the compression foot exerts a vertically downward force on the sample positioned on the base portion by the action of the coil spring.

The present invention novel sample mounting fixture for sample holder can be advantageously used to prepare IC specimens that are glued to a protective glass slide. One of the major benefits provided by the present invention mounting fixture is that the high temperature curing process for the adhesive layer that mounts the IC specimen to the glass slide can be observed in real time during a high temperature curing process. For instance, the sandwiched structure of IC specimen/adhesive/protective glass slide may be positioned in a curing oven for a short time period such as 1~3 minutes. The sandwiched structure can then be taken out of the oven and positioned in an optical microscope for observation through the window provided in the fixture the condition of the adhesive. If air bubble inclusions are observed in the adhesive and since the adhesive is only partially cured after 1~3 minutes, the protective glass slide and the adhesive can be easily removed from the IC specimen. The mounting process can then be repeated to produce a sandwiched structure that does not have air bubble inclusions in the adhesive layer. The defect of cracking during sample polishing with the presence of air bubbles can thus be avoided.

Figure 2A:
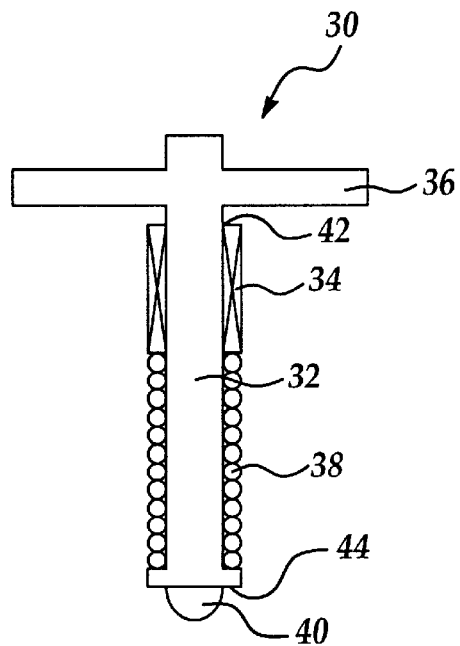
FIG. 2A is a front view of a present invention compression means including a shaft, A compression foot, a coil spring and a sleeve bearing.
Figure 2B:
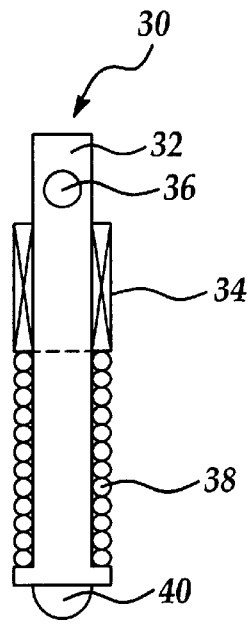
FIG. 2B is a side view of the present invention compression means shown in FIG. 2A.
Figure 3A:
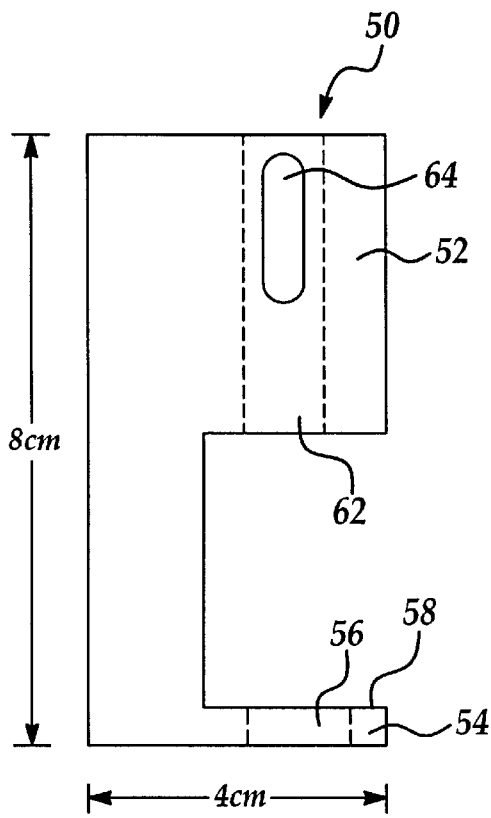
FIG. 3A is a sample mounting fixture of the present invention illustrating a base portion and a top portion equipped with elongated slot openings.
Figure 5:
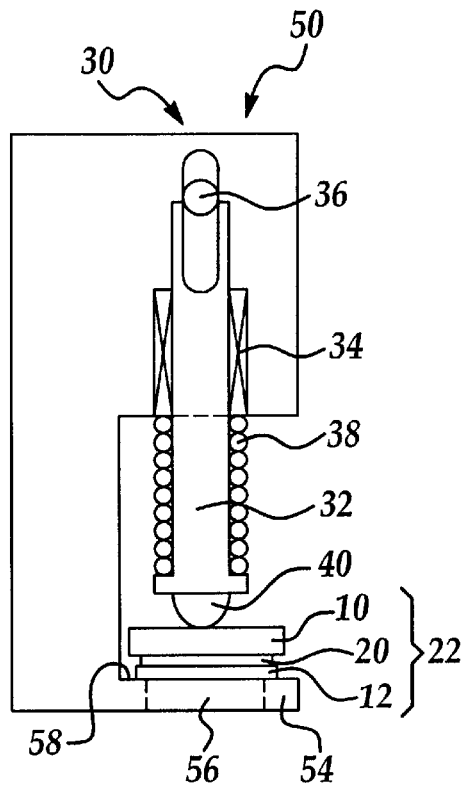
FIG. 5 is a cross-sectional view of the compression means and the sample mounting fixture of FIG. 4 with an IC specimen positioned in the fixture.

The unique structure of the present invention sample mounting fixture allows the complete fixture to be mounted on the specimen stage of an optical microscope for observation through a window in the base portion of the fixture. Referring now to FIG. 2A, wherein a present invention compression means 30 is shown. The compression means 30 is constructed by a shaft portion 32, a sleeve bearing 34, a handle portion 36, a coil spring 38 and a compression foot 40. A side view of the compression means 30 is shown in FIG. 2B. The sleeve bearing 34, when frictionally mounted in a recess (not shown) provided in the top portion 52 of the mounting fixture 50, shown in FIG. 3A, provides guidance for a vertical movement of the shaft 32 through the aperture 42 in the sleeve bearing. The coil spring 38 should be suitably selected with a spring constant such that while it provides a suitable compression force on the sample, as shown in FIG. 5, it does not cause difficulty in moving the shaft 32 upwardly by the handle 36. The compression foot 40 is mounted on the bottom surface 44 of the shaft 32 and should be fabricated of a pliable plastic material. A suitable pliable plastic material that is high temperature and chemical resistant is teflon. The pliability of the plastic material provides a cushioning effect when the compression foot 40 is pressed against the IC specimen 10, as shown in FIG. 5.

Figure 3B:
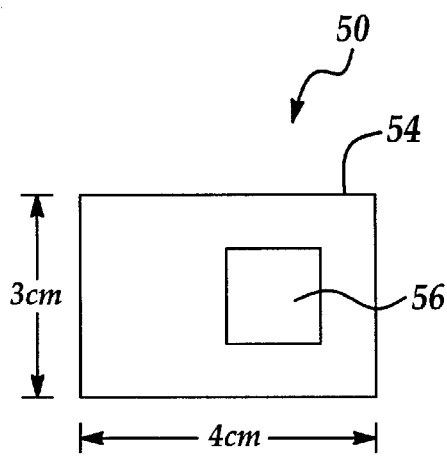
FIG. 3B is a bottom view of the sample mounting fixture of FIG. 3A illustrating an observation window provided therein.

FIGS. 3A and 3B illustrate the present invention sample mounting fixture 50, i.e. FIG. 3A shows a side view while FIG. 3B shows a bottom view. The sample mounting fixture 50 is constructed by a base portion 54 and a top portion 52. The base portion 54 is provided with a window 56, or an aperture covered by a transparent window (not shown). The base portion 54 is further provided with a flat top surface 58 for positioning a sample/adhesive/substrate thereon. The top portion 52 is provided with a recess 62 for frictionally engaging the sleeve bearing 34. Two elongated slot openings 64 are provided in the side walls of the top portion 62 such that the handle 36 of the compression means 30 penetrates therethrough for operating by human fingers (not shown). It should be noted, while not shown in FIGS. 3A and 3B, the top portion 52 can be suitably provided in two split sections (when viewed from the front) such that the compression means 30 can be easily installed therein, i.e., the sleeve bearing 34 to frictionally engaging the recessed 62 and the handle 36 to penetrate through the elongated slot openings 64.

The shaft 32 and the sample mounting fixture 50 can be advantageously fabricated of a metal, such as a lightweight aluminum. Any other metal that does not produce contaminating particles, such as stainless steel may also be used. Suitable dimensions for the present invention sample mounting fixture are shown in FIGS. 3A and 3B. For instance, a suitable length of the base portion 54 may be 4 cm, a suitable width of the base portion 54 may be 3 cm, while a suitable height of the fixture may be 8 cm. It should be noted that these dimensions are supplied as a reference only, any other suitable dimensions may also be used as long as it will suitably hold an IC specimen. For instance, a minimum dimension of 2 cm×4 cm for the base portion 54, while a maximum dimension is limited by the space in a specimen stage in an optical microscope. The sample mounting fixture 50 should be small enough that it will fit inside the specimen stage of a microscope such that it can be observed during a curing process.

Figure 4:
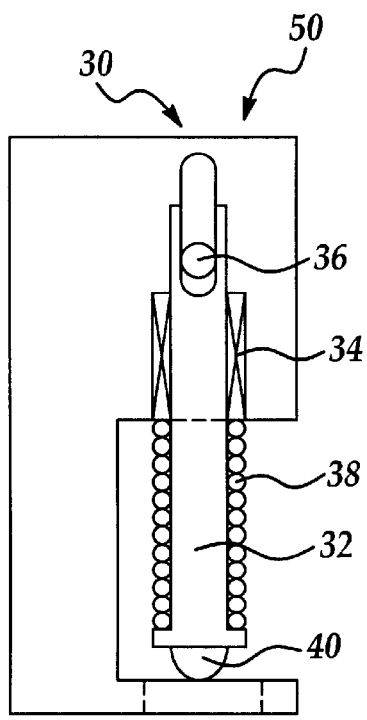
FIG. 4 is a cross-sectional view of the present invention compression means mounted in the sample mounting fixture.

FIGS. 4 and 5 illustrate the present invention sample mounting fixture with the compression means installed therein. FIG. 5 further illustrates the positioning of the sandwiched structure 22 on the top surface 58 of the base portion 54. It should be noted that the sandwiched structure 22 is mounted such that the protective glass slide 12 faces the window 56 to enable an observation of the adhesive 20 after a short period of curing, i.e., about 2–5 minutes. If air bubble inclusions are discovered in the adhesive layer 20, the sandwiched structure 22 can be disassembled to remove the protective glass slide 12 and the adhesive layer 20 from the IC specimen 10. By utilizing the present invention novel apparatus, one-of-a-kind test specimens can be saved for providing valuable test data.

The present invention novel apparatus has therefore been amply described in the above descriptions and in the appended drawings of FIGS. 2A–5.

While the present invention has been described in an illustrative manner, it should be understood that the terminology used is intended to be in a nature of words of description rather than of limitation.

Furthermore, while the present invention has been described in terms of a preferred and alternate embodiment, it is to be appreciated that those skilled in the art will readily apply these teachings to other possible variations of the inventions.

The embodiment of the invention in which an exclusive property or privilege is claimed are defined as follows.

What is claimed is:

1. An observable sample mounting fixture comprising:
   a base portion and a top portion integrally connected together providing a cavity therein-between for receiving a sample;
   said base portion being provided with a window for observing said sample when positioned on said base portion;

said top portion being provided with a recess therein receiving a compression means, said recess further includes elongated slot openings through sidewalls of said top portion for receiving a handle of said compression means;

said compression means having a shaft, a sleeve bearing for receiving said shaft in an upright position through a center aperture, a coil spring mounted on said shaft for pressing a compression foot formed on a bottom end of the shaft against a top surface of said sample when said sample is positioned on said base portion; and said coil spring having an upper end pressing against a lower surface of said sleeve bearing fixedly mounted in the recess in said top portion of the fixture such that said compression foot exerts a vertically downward force on said sample positioned on said base portion by the action of said coil spring.

2. An observable sample mounting fixture according to claim 1, wherein said window in said base portion being formed of an aperture and a transparent plate covering said aperture.

3. An observable sample mounting fixture according to claim 1, wherein said handle integrally formed with said shaft of the compression means for gripping by human fingers when said handle protrudes through said elongated slot openings to compress said coil spring and to lift said compression foot from said top surface of the sample.

4. An observable sample mounting fixture according to claim 1, wherein said base portion and said top portion having a cross-sectional area of a rectangle.

5. An observable sample mounting fixture according to claim 1, wherein said base portion and said top portion having a cross-sectional area of at least 2 cm×3 cm.

6. An observable sample mounting fixture according to claim 1, wherein said sample being a sample for transmission electron microscopy.

7. An observable sample mounting fixture according to claim 1, wherein said sample being an integrated circuit chip mounted to a glass slide by a transparent adhesive.

8. An observable sample mounting fixture according to claim 1, wherein said mounting fixture being fabricated of a metal.

9. An observable sample mounting fixture according to claim 1, wherein said mounting fixture being made of aluminum.

10. An observable sample mounting fixture according to claim 1, wherein said compression foot formed of teflon.

11. An inspectable sample holder for bonding a sample to a substrate comprising:
   a holder body having a bottom plate equipped with a see-through window, said bottom plate having a flat top surface for receiving said sample and said substrate thereon;
   a compression shaft equipped with a compression foot on a bottom of the shaft;
   a sleeve bearing frictionally engaging a recess in said holder body for vertically guiding said compression shaft through a center aperture in said bearing; and
   a coil spring acting between said sleeve bearing and said compression foot for vertically pressing said sample and said substrate together against said bottom plate of the holder body.

12. An inspectable sample holder for bonding a sample to a substrate according to claim 11, wherein said sample is an integrated circuit chip and said substrate is a glass slide.

13. An inspectable sample holder for bonding a sample to a substrate according to claim 11, wherein said sample and said substrate are bonded together by a transparent adhesive.

14. An inspectable sample holder for bonding a sample to a substrate according to claim 11, wherein said compressing shaft further comprises a handle portion integrally formed therewith for gripping by human fingers for relieving a compressive force placed on said sample and substrate by said coil spring.

15. An inspectable sample holder for bonding a sample to a substrate according to claim 14, wherein said handle portion protrudes through elongated slot openings in said holder body for gripping by human fingers.

16. An inspectable sample holder for bonding a sample to a substrate according to claim 11, wherein wherein said holder body is fabricated of a metal.

17. An inspectable sample holder for bonding a sample to a substrate according to claim 11, wherein said compression foot being formed without a sharp point.

18. An inspectable sample holder for bonding a sample to a substrate according to claim 11, wherein said see-through window shows air bubble formation in a transparent adhesive layer between said sample and a substantially transparent substrate.

19. An inspectable sample holder for bonding a sample to a substrate according to claim 11, wherein a substantially transparent epoxy adhesive is used to bond said sample to said substrate.

* * * * *